US005636101A

United States Patent [19]
Bonsall et al.

[11] Patent Number: 5,636,101
[45] Date of Patent: Jun. 3, 1997

[54] TOUCH SCREEN ENCLOSURE SYSTEM HAVING TOUCH SCREEN PAN AND HINGED REAR ENCLOSURE SECTION FOR EASE OF SERVICEABILITY

[75] Inventors: Glenn D. Bonsall; Ezra T. Peachey, both of Vancouver; Gary O. Kaga, West Vancouver, all of Canada

[73] Assignee: Dynapro Systems, Inc., Westminster, Canada

[21] Appl. No.: 534,374

[22] Filed: Sep. 27, 1995

[51] Int. Cl.$^6$ .............................. G06F 1/16; H05K 5/02; H05K 7/02
[52] U.S. Cl. .......................................... 361/681; 361/724
[58] Field of Search ........................ 364/708.1; 178/18; 345/173, 175, 905; 40/448, 575; 312/7.2, 223.2, 223.3; 359/83; 361/681–683

[56] References Cited

U.S. PATENT DOCUMENTS

| | | |
|---|---|---|
| 4,716,496 | 12/1987 | Fritsch . |
| 4,720,781 | 1/1988 | Crossland et al. . |
| 4,746,919 | 5/1988 | Reitmeier . |
| 4,775,765 | 10/1988 | Kimura et al. . |
| 4,786,896 | 11/1988 | Harte . |
| 4,789,858 | 12/1988 | Fergason et al. . |
| 4,814,760 | 3/1989 | Johnston et al. . |
| 4,821,029 | 4/1989 | Logan et al. . |
| 4,839,634 | 6/1989 | More et al. . |
| 4,870,458 | 9/1989 | Shibuya et al. . |
| 4,873,578 | 10/1989 | Tognoni et al. . |
| 4,911,536 | 3/1990 | Ditzik . |
| 4,931,907 | 6/1990 | Robinson et al. . |
| 5,150,231 | 9/1992 | Iwamoto et al. . |
| 5,194,852 | 3/1993 | More et al. . |
| 5,235,509 | 8/1993 | Mueller et al. . |
| 5,299,043 | 3/1994 | Taylor et al. . |
| 5,351,143 | 9/1994 | Sato et al. . |
| 5,351,176 | 9/1994 | Smith et al. ............................ 361/681 |
| 5,379,057 | 1/1995 | Clough et al. . |
| 5,390,005 | 2/1995 | Kimoto et al. . |
| 5,430,607 | 7/1995 | Smith ...................................... 361/683 |

Primary Examiner—Michael W. Phillips
Attorney, Agent, or Firm—Foley & Lardner

[57] ABSTRACT

An enclosure system for an electronic device such as a capacitive touch screen system utilizes hinged doors to provide access to the various electronic components. The enclosure system preferably includes a front cover coupled to a rear enclosure via a hinge. A pan located between the front cover and the rear enclosure is pivotably coupled to the front cover. The front cover houses a touch screen and a display between the pan and the front cover. The rear enclosure houses computer equipment and power electronics for use by the touch screen. The front cover or bezel is releasably secured to the rear enclosure via a latch mechanism. The touch screen is accessible by swinging the front cover from the rear enclosure and opening the pan from the front cover.

20 Claims, 11 Drawing Sheets

TOUCH SCREEN ENCLOSURE SYSTEM HAVING TOUCH SCREEN PAN AND HINGED REAR ENCLOSURE SECTION FOR EASE OF SERVICEABILITY

CROSS-REFERENCE TO RELATED APPLICATIONS

The present application is related to the application entitled, "A Touch Screen Enclosure Having An Insertable Graphic Sheet," U.S. patent application Ser. No. 08/534,373, filed by Glenn D. Bonsall on an even date herewith, assigned to the assignee of the present invention. The present application is also related to the application entitled, "A Touch Screen Enclosure Having A Universal Rear Enclosure Unit," U.S. patent application Ser. No. 08/534,807, filed by Bonsall, et al. on an even date herewith, and assigned to the assignee of the present invention.

FIELD OF THE INVENTION

The present invention generally relates to an enclosure for electronic appliances, equipment or devices. More particularly, the present invention relates to an enclosure system or housing unit for a touch screen.

BACKGROUND OF THE INVENTION

Touch screen systems such as capacitive touch screens generally include a sensor matrix or array and a control circuit. The control circuit measures capacitive loading on the array to determine the position or location of the touch on the array. The array is mounted on a translucent screen or substrate. The control circuit generally receives electrical power from power circuitry which is electrically coupled to the control circuit. The power circuitry can be comprised of a power supply and fan.

The touch screen is typically utilized in conjunction with a liquid crystal display or other light sources. The display projects variable images upon or through the touch screen. Touch screen systems also can include various computer equipment such as a motherboard, ISA cards, hard drives, memory, floppy drives, graphic devices, or other equipment for enhancing the functions and capabilities of the touch screen system.

Prior art touch screen systems including the touch screen, display, and computer equipment are generally contained in an enclosure comprised of a front bezel or shroud and a back enclosure. The touch screen components including the control circuit, sensor array, and power circuits are located on a single chassis between the shroud and the rear enclosure. The display and computer equipment are also located between the rear enclosure and the shroud. The shroud is typically fixed to the rear enclosure by screws or other fastening devices.

Heretofore, when service personnel performed diagnostic tests or repairs on the touch screen system, the shroud had to be removed from the rear enclosure and the touch screen system had to be partially disassembled to gain access to the display, computer equipment, power circuits, electrical connectors and other components. This configuration of the enclosure and touch screen system is particularly disadvantageous for replacement, repair, and adjustment of periodically serviced equipment such as displays. For example, the light tubes associated with the display typically require replacement on a regular basis. Thus, the prior art configuration for touch screen enclosures and touch screen systems increases the time and cost associated with servicing and manufacturing a touch screen system.

Further, prior art touch screen systems are employed either within a wall or cabinet or mounted to a post or boom. Mounting the enclosure within the wall or to a post makes it difficult to access the various components even when the shroud is removed from the rear enclosure unit because the enclosure remains fixed within the wall or to the post. These mounting configurations require service personnel to disassemble the touch screen system and enclosure for major service.

Thus, there is a need for an enclosure system optimized for ease of serviceability. There is also a need for a touch screen enclosure having a hinged mounting interface which provides access to the electrical connectors and components associated with the computer equipment. Further, there is a need for an enclosure system having separated compartments for holding the touch screen and the computer equipment, and having a hatch for providing access to electrical connectors.

SUMMARY OF THE INVENTION

The present invention relates to an enclosure system for a touch screen and associated touch screen electronic components. The enclosure system includes a hinge, a front cover coupled to the hinge, a pan pivotably coupled to the front cover, and a rear enclosure coupled to the hinge. The front cover houses the touch screen between the pan and the front cover. The rear enclosure is releasably secured to the front cover about the hinge. The rear enclosure houses at least a portion of the associated electronic components. The rear enclosure includes a hatch. The front cover can be opened from the pan and the rear enclosure to expose the touch screen and the hatch can be opened to expose electrical connectors associated with the electronic components.

The present invention also relates to a capacitive touch screen system including a touch screen and electronic circuitry. The enclosure includes a front housing section, a pan coupled to the front housing section, and a rear housing section pivotally coupled to the front housing section. The touch screen is disposed between the front housing section and the pan. The front housing section contains at least a portion of the electronic circuitry. The rear housing section includes a hatch door. The touch screen is accessible by swinging the front housing section from the rear housing section and opening the pan from the front housing section. Electrical connectors are accessible by opening the hatch door.

The present invention also relates to an enclosure system for a touch screen. The enclosure system includes a front enclosure means for housing the touch screen and a rear enclosure means for housing electronic components associated with the touch screen. The rear enclosure means is releasably secured to the front enclosure means about a hinge to provide access to the touch screen. The rear enclosure means has a door which provides access to electrical connectors associated with the electronic components.

According to an exemplary aspect of the present invention, the touch screen is located in a front cover or bezel and electronic circuitry for computer equipment is located in a rear enclosure. The bezel is pivotably mounted to the rear enclosure so service personnel may gain easy access to both the touch screen and the electronic circuitry as the bezel which contains the touch screen is swung away from the rear enclosure which holds the electronic circuitry. Preferably, the bezel is mounted to the rear enclosure via a hinge and releasably secured to the rear enclosure by a latch.

The configuration advantageously allows access to a display which is located within the bezel.

In accordance with another exemplary aspect of the present invention, the rear enclosure includes a hatch which provides access to electronic connections associated with the components located in the rear enclosure as well as electronics located in the front bezel. The hatch preferably includes an extended hatch cap for housing power cables and connectors and a boom mount interface. Preferably, the boom mount interface on the hatch is mounted to the boom or post so the enclosure may be swung away from the boom interface via the hatch, thereby providing a more accessible touch screen system.

In still a further aspect of the present invention, the enclosure system includes a pan located between the rear enclosure and the front bezel. The pan holds the touch screen between it and the bezel. The pan provides a separation between the components such as the display and touch screen disposed in the front bezel and the computer equipment and power circuits disposed in the rear enclosure. The pan is preferably pivotably mounted to the front bezel to provide easy access to the touch screen and display.

DETAILED DESCRIPTION OF THE PREFERRED EXEMPLARY EMBODIMENT

Figure 1:
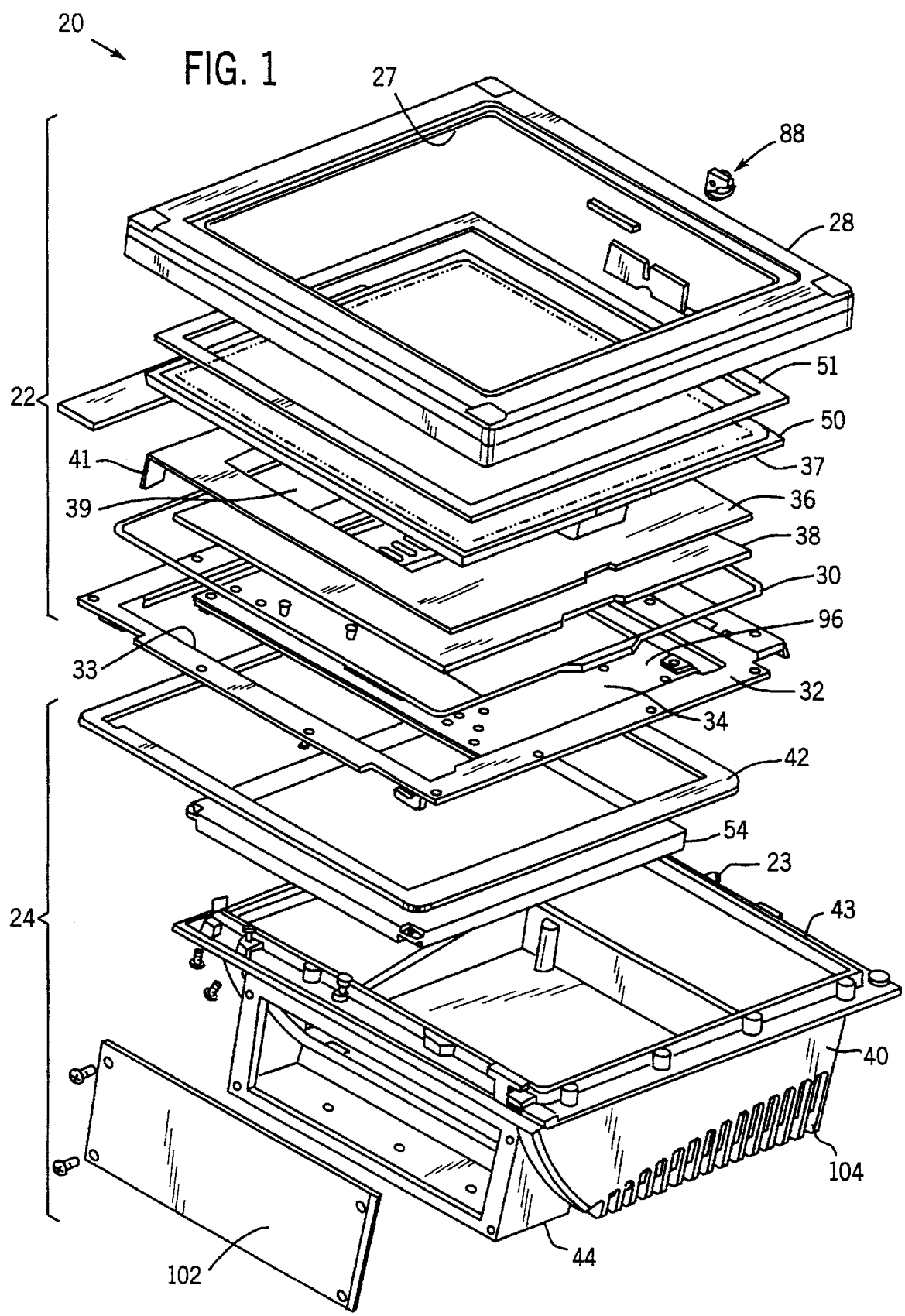
FIG. 1 is an exploded perspective view showing the front of a short bezel touch screen enclosure system in accordance with a first exemplary embodiment of the present invention.

FIG. 1 illustrates a touch screen enclosure system 20 which houses a touch screen such as capacitive touch screen 50. Enclosure system 20 includes a front enclosure section 22 and a rear enclosure section 24.

Front enclosure section 22 includes a short bezel 28, a seal 30, a touch screen plate 32, a touch screen gasket 51 and a pan 34. Plate 32 is stainless steel and has an aperture 33 which is covered by pan 34. Bezel 28 is die cast aluminum and has an aperture 27 so a user can directly touch screen 50.

A display such as an LCD flat panel display 54 and touch screen 50 are held between pan 34 and short bezel 28. Preferably, display 54 is directly attached to a front side 96 of pan 34 by screws (not shown). Screen 50 is held between short bezel 28 and display 54 and surrounded by seal 30. Seal 30 lies within bezel 28 and has a circular cross sectional area.

Front enclosure 22 also can house a graphics underlay or insertable custom graphics sheet 36 and a plastic retaining member 38. Plastic retaining member 38 presses sheet 36 against a back surface 37 of touch screen 50. Sheet 36 can include menus, instructions, customized graphics or other information. Retainer 38 includes an aperture 39 so light and images from display 54 can pass through retainer 38, sheet 36 and screen 50. Display 54 extends from pan 34 through aperture 33 to retainer 38.

Rear enclosure unit 24 includes a rear enclosure 40 and a rear enclosure seal 42. Rear enclosure 40 preferably includes a hatch 44 which is discussed in more detail with reference to FIGS. 7–9. Seal 42 sits on a ridge 43 of enclosure 40 and has a rectangular cross sectional area. Seal 42 is wider than ridge 43. Rear enclosure 40 may also include an extended hatch cap 48 (FIG. 11) attached to hatch 44 for storing bulky power connectors and power cables. Enclosure 40 is die cast aluminum and includes heat dissipation fins 104 and a latch member 23.

Figure 2:
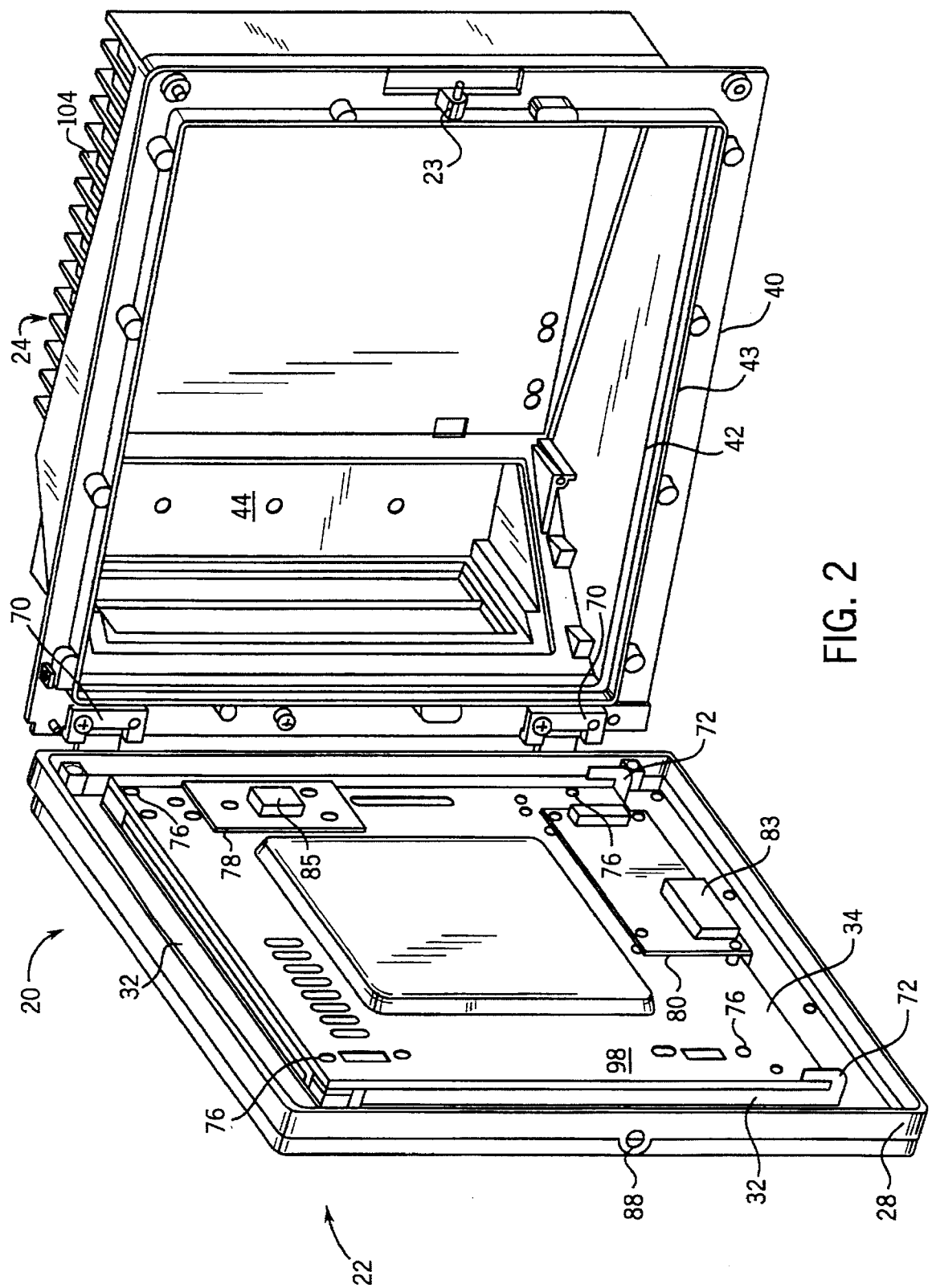
FIG. 2 is a perspective view of the short bezel touch screen enclosure system illustrated in FIG. 1 shown with a front enclosure section opened from a rear enclosure section.

With reference to FIG. 2, enclosure system 20 is shown in an open position (e.g., front enclosure 22 is open from rear enclosure 24). Front bezel 28 is pivotably coupled to rear enclosure 40 by hinges 70. Hinges 70 allow front bezel 28 to be swung away from rear enclosure 40. Pan 34 is configured so display 54 is positioned in aperture 33 (FIG. 1) of plate 32 when pan 34 is in a closed position.

Front bezel 28 includes a latch mechanism 88 which engages latch member 23 on rear enclosure 40 when enclosure system 20 is in a closed position (e.g., front bezel 28 is closed upon rear enclosure 40). Latch mechanism 88 is preferably driven by an Allen wrench or other key (not shown) and includes a grooved cam (not shown) which captures and locks latch element 23.

Pan 34 rests on hook elements 72 of touch plate 32 and is secured to plate 32 by screws 76 when pan 34 is in a closed position. Plate 32 is attached to front bezel 28 via screws or other attachment devices. Control electronics 78 for display 24 and control electronics 80 for touch screen 50 are mounted to a rear side 98 of pan 34. A connector 83 for electronics 80 and a connector 85 for electronics 78 are disposed to connect to screen 50 and display 54, respectively, via conductors which wrap around the edges of or are disposed through pan 34.

Sheet 36 includes tabs 41 which allow sheet 36 to be removed from between screen 50 and retainer 38 while pan 34 is open. Sheet 36 can also be inserted between screen 50 and retainer 38 via tabs 41.

The orientation of system 20 advantageously compartmentalizes the various components of the touch screen system. For example, computer equipment (not shown) such as a motherboard, ISA cards, disk drives, memory, and other electronic devices, is stored in rear enclosure 40, display 54 is stored on front side 96 (FIG. 1) of pan 34, and screen 50 is stored adjacent aperture 27 (FIG. 1) of bezel 28. Such a configuration allows service personnel to more easily access the various components stored in system 20. Access to connectors 83 and 85, control circuitry 80, control circuitry 78, and the computer equipment (not shown) is made simply by opening latch mechanism 88 and swinging front enclosure section 22 from rear enclosure section 24.

Figure 3:
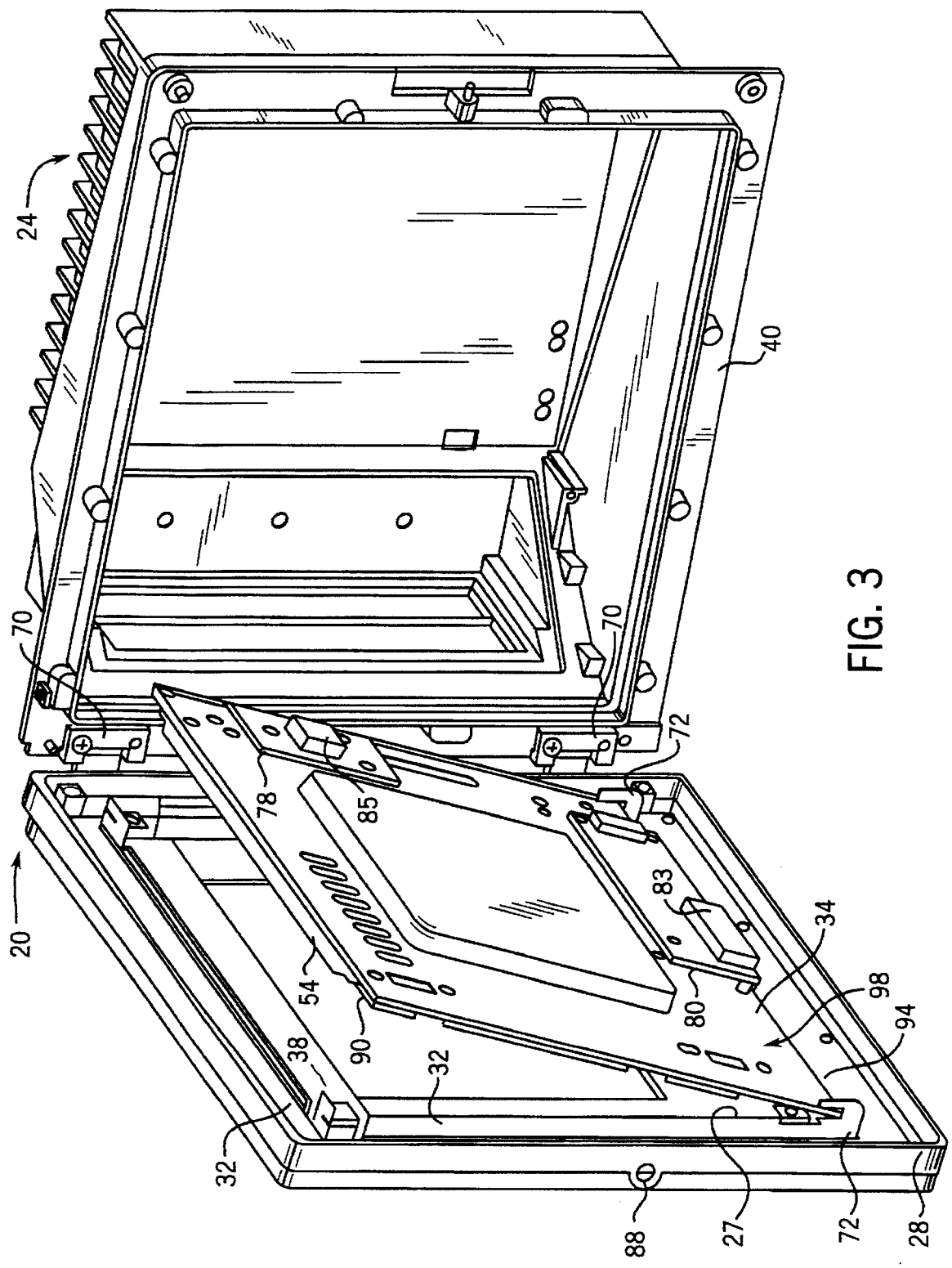
FIG. 3 is a perspective view of the short bezel touch screen illustrated in FIG. 2 shown with a pan in an open position from a bezel.

In FIG. 3, pan 34 is shown in an open position. Retainer 38 is held between plate 32 and screen 50. Sheet 36 (FIG. 1) can be pulled from between retainer 38 and screen 50 by tabs 41 for cleaning or replacement. Mounting sheet 36 behind screen 50 protects sheet 36 from wear. Thus, the configuration of pan 34 and front bezel 28 allows easy servicing of graphic sheet 36.

Pan 34 can be pivotably opened or tilted away from plate 32 by removing screws 76 and allowing pan 34 to rest on hook elements 72. Hook elements 72 receive an end 94 of pan 34. Preferably, display 54 is mounted on pan 34 and the light source (not shown) of display 54 can be slid out from a side 90 when pan 34 is pivotably open from plate 32. Such a configuration allows routine maintenance to be easily performed on display 54 without requiring disassembly of major components within touch screen enclosure system 20. For example, the light tube (not shown) associated with display 54 may be easily reached simply by pivotably opening or tilting pan 34 from front bezel 28. Additionally, such a configuration provides service personnel with limited access to screen 50 and display 54 when pan 34 is in an open position.

Figure 4:
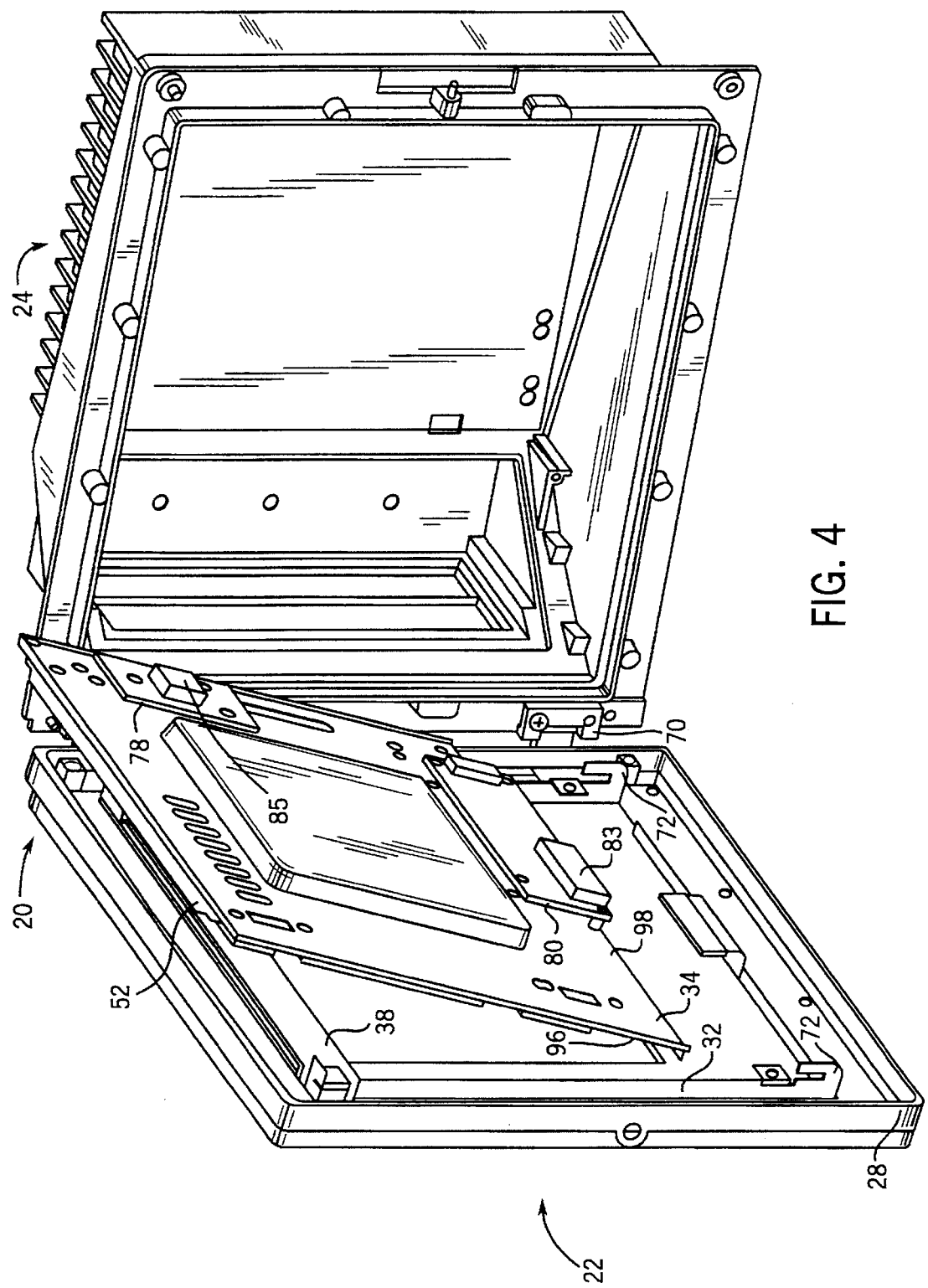
FIG. 4 is a perspective view of the short bezel touch screen illustrated in FIG. 3 shown with the pan removed from the bezel.

With reference to FIG. 4, system 20 is shown with pan 34 completely removed from bezel 28 and plate 32. Pan 34 may be removed when major servicing is needed on components such as display 54, circuit 78 or circuit 80 by removing screws 76 and lifting pan 34 from hook elements 72. Such a feature allows service personnel to completely replace all components on pan 34 merely by attaching a new pan 34 (housing the associated components) and reconnecting connectors 83 and 85. The replaced pan 34 can be sent offsite for further testing of components such as display 54, circuit 78, and circuit 80. Removing pan 34 also provides unencumbered access to other components located in front bezel 28 such as retainer 38, graphic sheet 36, seal 30, and touch screen 50.

Figure 5:
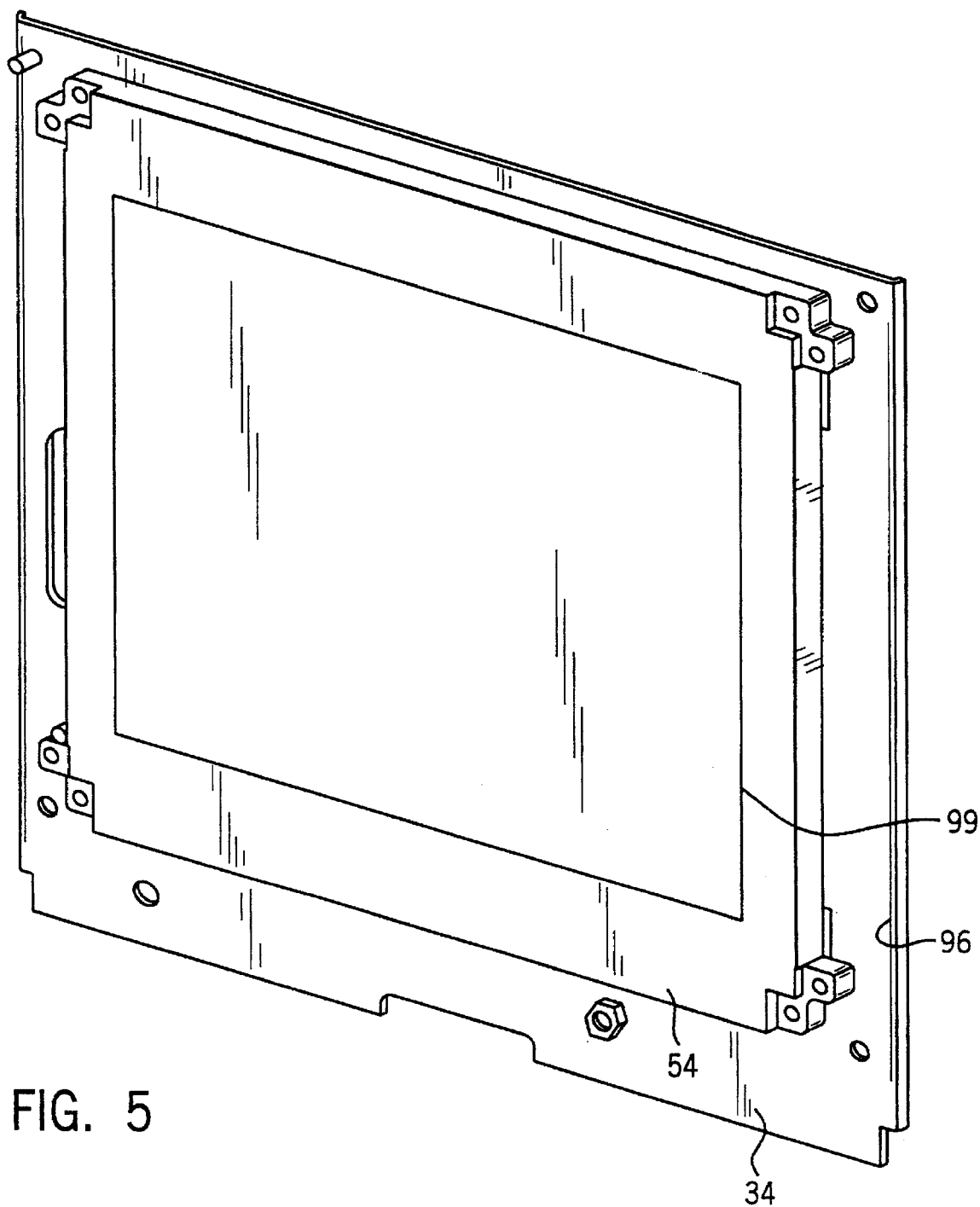
FIG. 5 is a more detailed perspective view of the pan illustrated in FIG. 4 showing a front surface of the pan.
Figure 6:
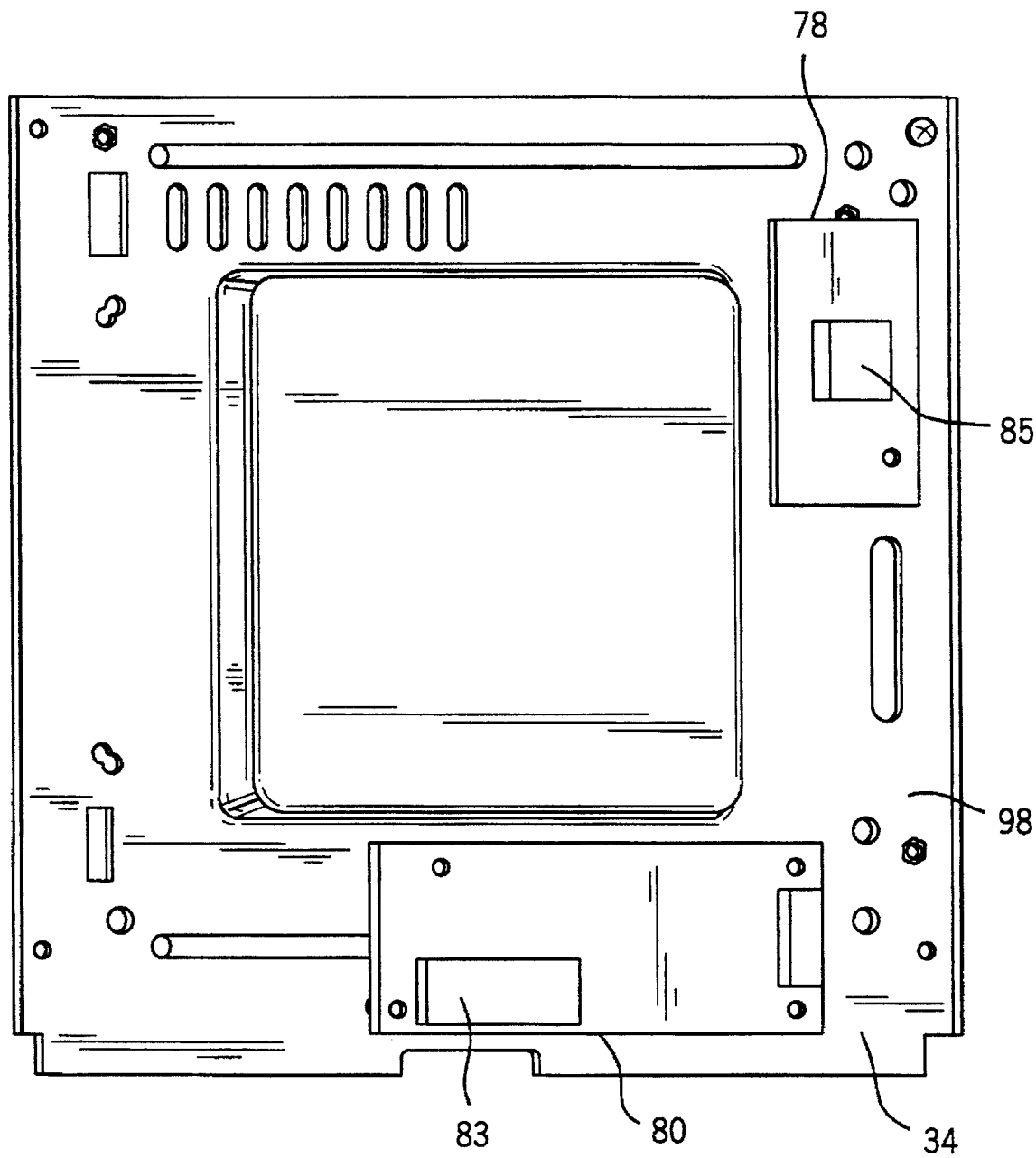
FIG. 6 is a perspective view of the pan illustrated in FIG. 4 showing a rear surface of the pan.

With reference to FIG. 5, a more detailed view of front side 96 of pan 34 is shown. Display 54 is mounted on front side 96 of pan 34. Display 54 includes a display area 99 which corresponds to aperture 39 of retainer 38. With reference to FIG. 6, rear side 98 of pan 34 is shown in more detail. Rear side 98 includes control circuits 78 and 80.

Figure 7:
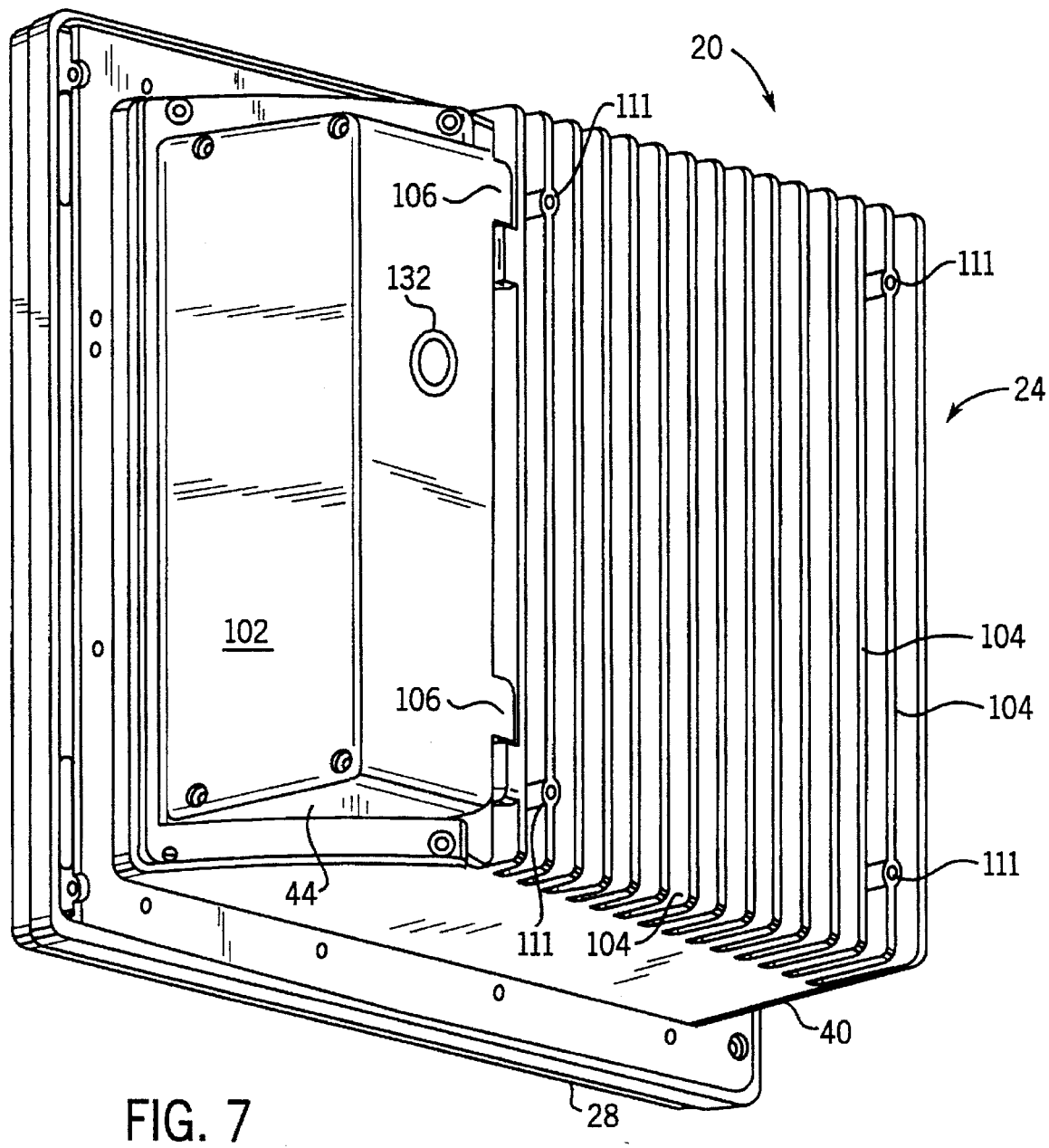
FIG. 7 is a perspective view showing the rear of the short bezel touch screen enclosure system illustrated in FIG. 1.

In FIG. 7, a rear view of enclosure system 20 shows rear enclosure section 24. Rear enclosure 40 includes hatch 44 in a closed position. Hatch 44 is coupled to enclosure 40 by hinges 106 and includes a removable panel 102. Hatch 44 is die cast aluminum. Threaded mounting holes 111 in enclosure 40 may be used to attach it to or within a wall or panel (not shown). Enclosure 40 includes heat dissipation fins 104. Hatch 44 also can include an aperture 132 for receiving a boom mount interface.

Removable panel 102 can be removed and a compartment such as extended hatch cap 48 (FIG. 11) can be attached. Preferably, panel 102 is secured to hatch 44 via screws (not shown). Panel 102 may be removed to access cables or wires (not shown) coupled to enclosure 40, to improve air flow for system 20, or to provide ready access to floppy drives (not shown) stored in enclosure 40.

Figure 8:
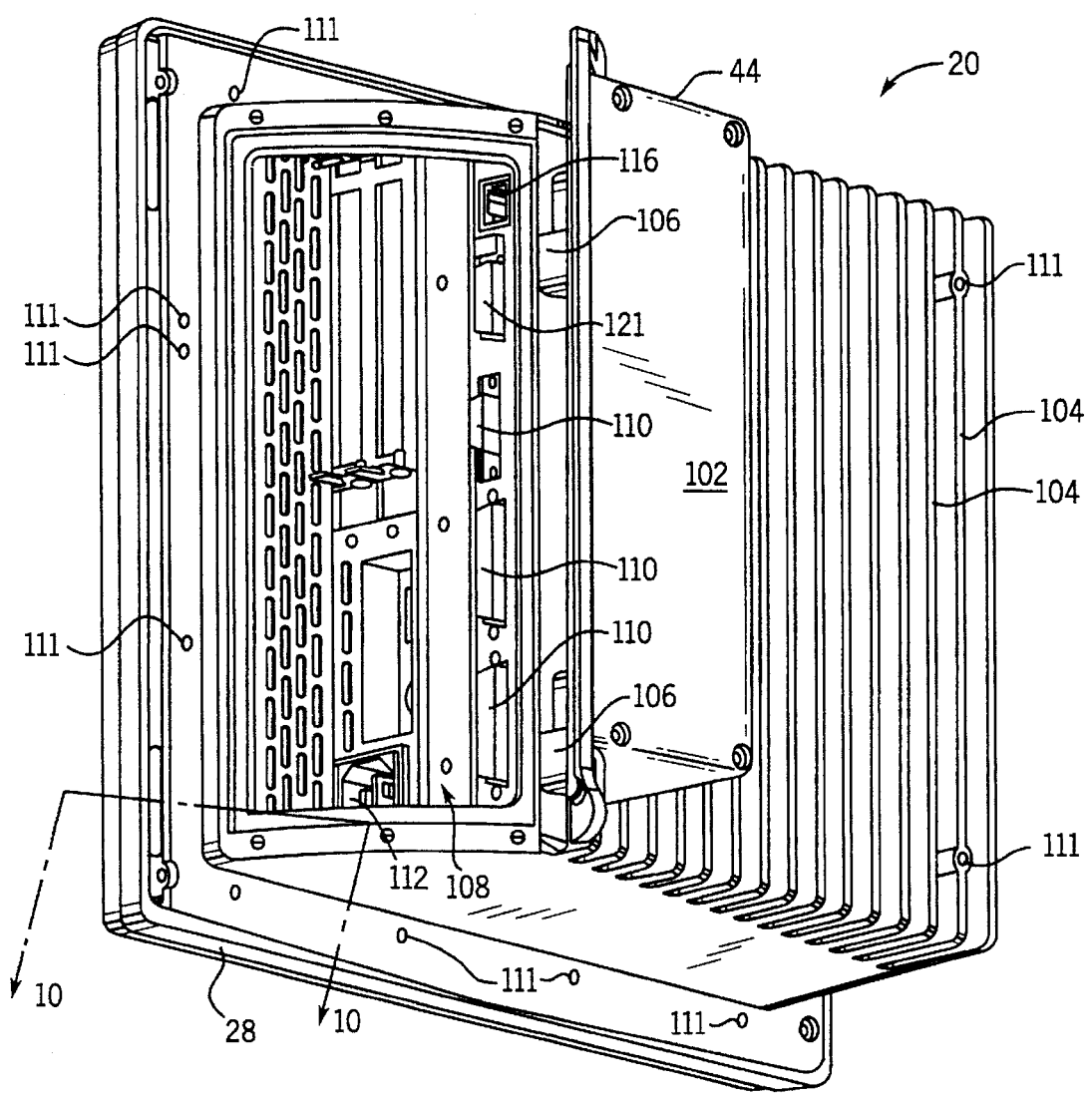
FIG. 8 is a perspective view of the short bezel touch screen illustrated in FIG. 7 showing a hatch door in an open position.

FIG. 8 illustrates enclosure system 20 with hatch 44 in an open position. Hatch 44 is pivotably coupled to rear enclosure 40 by hinges 106. Hinges 106 are preferably die cast aluminum and integrated with rear enclosure 40. A hatch door compartment 108 includes D-type electrical connectors 110 which are electrically coupled to computer equipment located in enclosure system 20. Additionally, hatch compartment 108 includes power connector 112, a connector 116, floppy disk connector 121, or other interfaces. Hatch door compartment 108 is preferably large enough to accommodate connectors 110, 112, and 116. Wires (not shown) associated with connectors 110, 112 and 116 can be inserted through aperture 132 (FIG. 7) when the boom mount is utilized.

Figure 9:
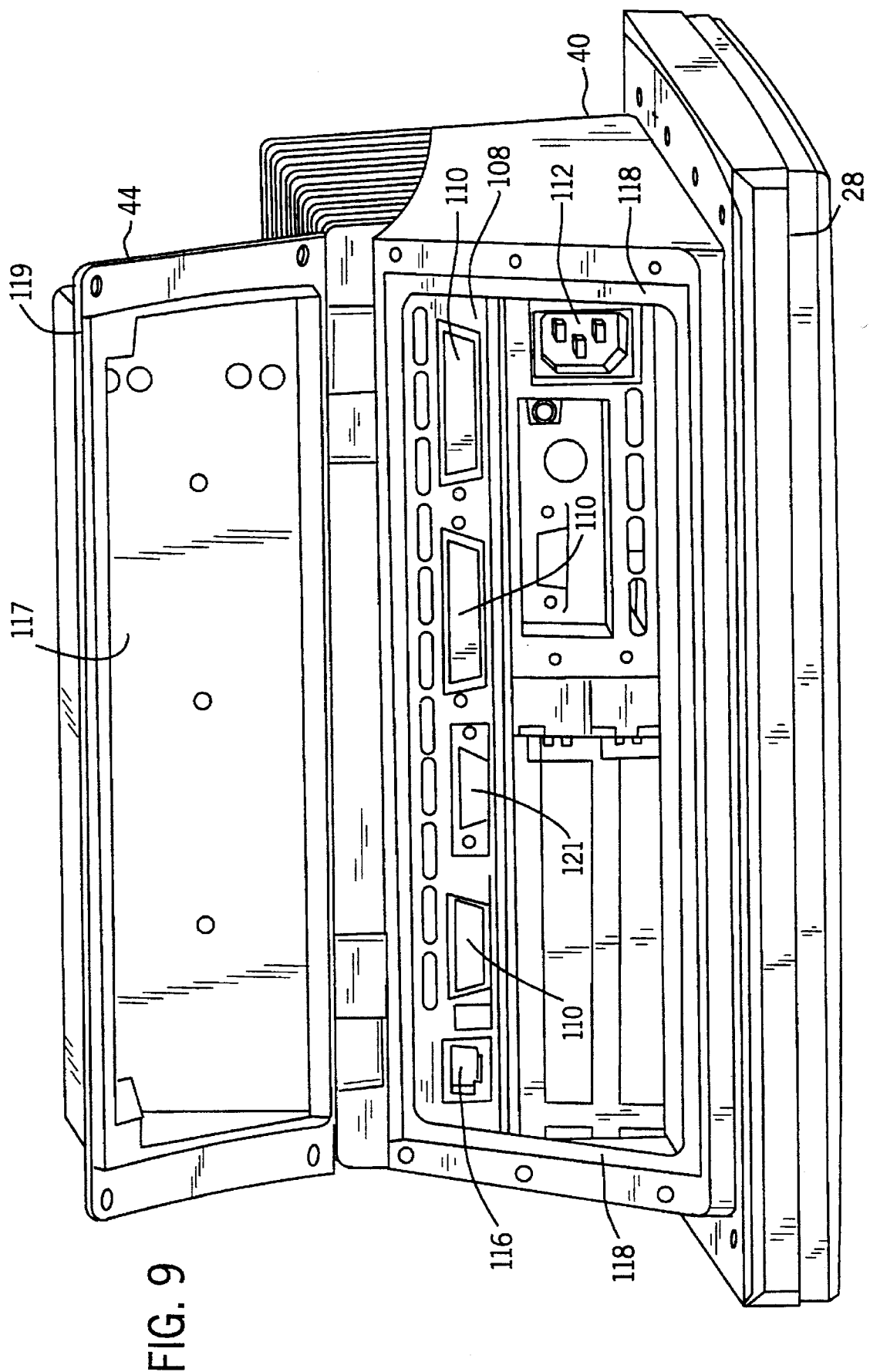
FIG. 9 is a perspective view of the short bezel touch screen enclosure system illustrated in FIG. 7 shown with the hatch door in an open position.

With reference to FIG. 9, hatch 44 includes a seal 118 for providing a watertight compartment 108. Seal 118 is squeezed by ridge 119 when hatch 44 is closed. Preferably, seal 118 is a rectangular gasket which is wider than ridge 119.

Hatch 44 has an interior surface 117 which is concave for maximizing space in compartment 108. Compartment 108 may also include LEDs (not shown) for providing indicia of the operation of the touch screen system in enclosure system 20 or access ports for use by the computer equipment (not shown) in enclosure 40.

When system 20 is used with a boom mount interface (not shown), enclosure 40 can be swung away from the boom mount (not shown). Hinges 106 and hatch door 42 allow system 20 to be pivotably moved with respect to the boom mount while system 20 is still attached to the boom mount. Such a feature allows system 20 to be more easily serviced and provides greater access to connectors 112, 114, and 116.

Figure 10:
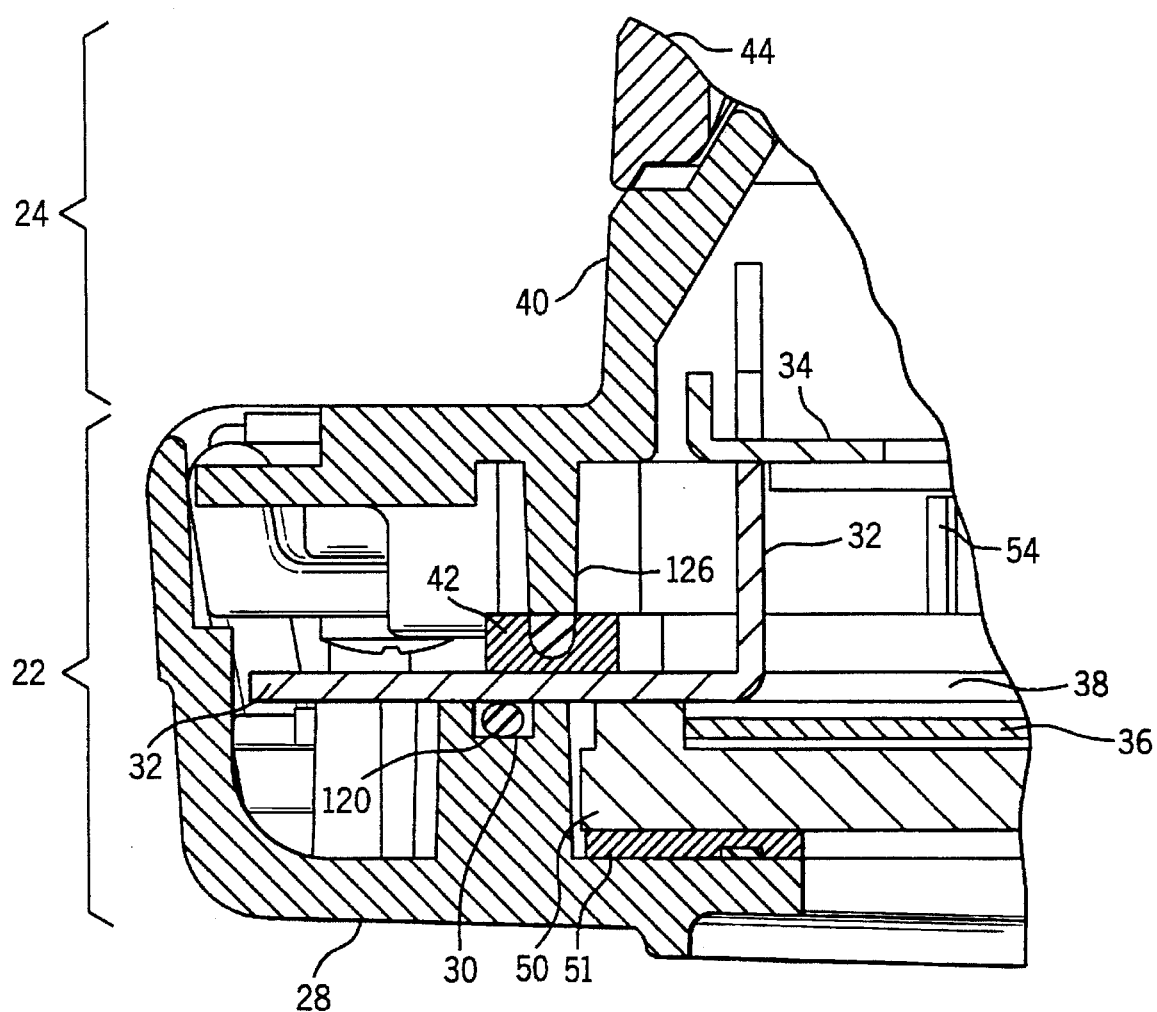
FIG. 10 is a partial cross-sectional view of a portion of the touch screen enclosure system illustrated in FIG. 8 across line 10—10.

With reference to FIG. 10, the structure of system 20 is shown in a cross-sectional view. System 20 includes an advantageous sealing mechanism comprised of seal 30 and seal 42. Seal 30 rests in a groove 120 in front bezel 28 and contacts plate 32 and front bezel 28. Seal 42 sits on a ridge 43 of rear enclosure 40 and contacts plate 32 and rear enclosure 40. Latch 88 (not shown in FIG. 11) compresses front enclosure section 22 to rear enclosure section 24 so seal 42 is squeezed between plate 32 and rear enclosure 40. The squeezing or compressing of seals 30 and 42 provides a NEMA rated watertight seal which prevents dust, liquids and small particles from reaching the interior of enclosure 40 or the interior of bezel 28. Latch 88 is configured to engage member 23 and draw bezel 28 to enclosure 40. Additionally, touch screen gasket 51 prevents dust, liquids and small particles from entering system 20 from between screen 50 and bezel 28.

Figure 11:
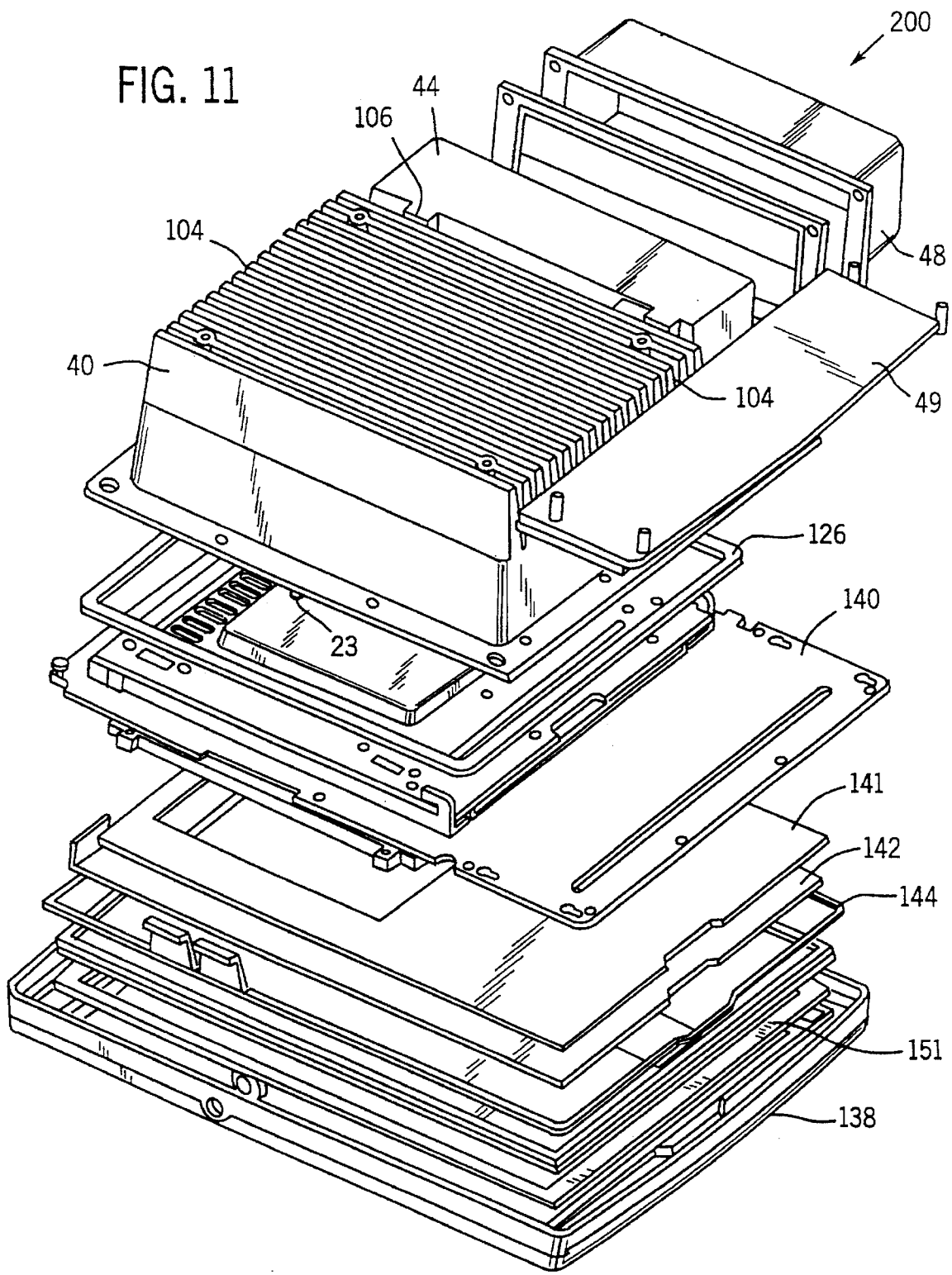
FIG. 11 is an exploded perspective view from the front of a long bezel touch screen enclosure system in accordance with a second exemplary embodiment of the present invention.

With reference to FIG. 11, enclosure system 200 includes a long bezel 138 and rear enclosure 40 substantially identical to rear enclosure 40. Long bezel 138 engages rear enclosure 40 similar to the way short bezel 28 engages enclosure 40 in system 20 described with reference to FIGS. 1–10.

Long bezel 138 is utilized to accommodate different touch screen sizes. Touch screen plate 140, plastic retainer 141, insertable custom graphic 142, gasket 151 and seal 144 are sized in accordance with the size of long bezel 138. Despite the size difference in sizes between long bezel 138 and short bezel 28, enclosure 40 may be utilized with either long bezel 138 or short bezel 28, because enclosure 40 is only sealed to touch screen plate 32 or 140 depending on which bezel 28 or 138 is utilized. In system 20, seal 42 between plate 32 and enclosure 40 prevents moisture or other debris from entering between plate 32 and enclosure 40 (FIGS. 1–10). Similarly, in system 200, seal 126 between enclosure 40 and plate 140 prevents moisture or other debris from entering between plate 140 and enclosure 40. Seal 144 prevents moisture or other debris from entering between plate 140 and long bezel 138.

Long bezel 138 can be utilized with the same rear enclosure 40 because seals 30 and 42 contact a plate 140 (instead of plate 32 in FIGS. 1–10) sized in accordance with long bezel 138. Therefore, by utilizing a two seal technique between long bezel 138 or short bezel 28 and enclosure 40, the same enclosure 40 can be a universal enclosure which is usable with long bezel 138 or short bezel 28. Therefore, manufacturing costs and equipment costs may be saved because a single universal rear enclosure 40 can be utilized for different bezels 28 or 138 in enclosure system 20 or 200.

A filler panel 49 attaches to plate 140 via fasteners or screws (not shown). Panel 49 protects a back side 143 of plate 140 which is not covered by enclosure 40.

It is understood that, while the detailed drawings and specific examples given describe preferred exemplary embodiments of the present invention, they are for the purposes of illustration only. The apparatus and method of the invention is not limited to the precise details and conditions disclosed. For example, although O-ring seals and gaskets are shown, other sealing systems are possible. Further, although hook elements are used to provide a pivotal coupling between the pan and the front bezel, other mechanisms may be utilized. Various changes can be made to the details disclosed without departing from the spirit of the invention which is defined by the following claims.

We claim:

1. An enclosure system comprising:
   a touch screen having associated touch screen electronic components;
   a hinge;
   a front enclosure coupled to the hinge, the front enclosure housing the touch screen;
   a pan pivotably coupled to the front enclosure, the touch screen being located between the pan and the front enclosure; and
   a rear enclosure coupled to the hinge, the rear enclosure being releasably secured to the front enclosure about the hinge, the rear enclosure housing at least a portion of the associated electronic components, the rear enclosure having a hatch; and
   wherein the front enclosure is opened from the rear enclosure and the pan is opened from the front enclosure to expose the touch screen and the hatch is opened to expose electrical connectors associated with the electronic components.

2. The enclosure system of claim 1 wherein the hatch is hinged to a back panel of the rear enclosure.

3. The enclosure system of claim 2 wherein the rear enclosure includes an extended hatch cap for storing power electronic components associated with the electronic components.

4. The enclosure system of claim 1 wherein a display is located between the pan and the touch screen.

5. The enclosure system of claim 4 wherein the display includes a light.

6. The enclosure system of claim 5 wherein the pan is attached to the display.

7. An enclosure for a touch screen system, the enclosure comprising:
   a touch screen having electronic circuitry;
   a front housing section;
   a pan coupled to the front housing section, the touch screen being disposed between the front housing section and the pan; and
   a rear housing section pivotably coupled to the front housing section, the front housing section containing at least a portion of the electronic circuitry, the rear housing section including a hatch door, wherein the touch screen is accessible by swinging the front housing section from the rear housing section and opening the pan from the front housing section, and electrical connectors associated with the electronic circuitry are accessible by opening the hatch door.

8. The enclosure of claim 7 wherein the rear housing section and the front housing section are pivotably coupled via a hinge and a latch mechanism.

9. The enclosure of claim 8 wherein a display is disposed between the pan and the touch screen.

10. The enclosure of claim 7 wherein the portion of the electronic components include power electronic components.

11. The enclosure of claim 7 wherein the rear housing section includes a boom mount interface.

12. The enclosure of claim 11 wherein the boom mount interface is located on the hatch door and external electrical conductors are coupled to the electrical connectors through the boom mount interface.

13. The enclosure of claim 12 wherein the pan is pivotably coupled to the front housing section.

14. An enclosure system comprising:
    a touch screen having electronic components;
    a front enclosure means for housing the touch screen, the front enclosure means including a touch screen pan; and
    a rear enclosure means for housing the electronic components associated with the touch screen, the rear enclosure means being releasably secured to the front enclosure means about a hinge to provide access to the touch screen, the rear enclosure means having a hatch door, the hatch door providing access to electrical connectors associated with the electronic components.

15. The enclosure system of claim 14 wherein the hatch door is hinged to a back panel of the rear enclosure means.

16. The enclosure system of claim 15 wherein the electrical connectors are D type connectors.

17. The enclosure system of claim 14 wherein the electronic components are power electronic components and the electrical connectors include a power connector.

18. The enclosure system of claim 14 wherein the touch screen pan is pivotally mounted to the front enclosure means and contains an LCD display.

19. The enclosure system of claim 18 wherein the touch screen pan rests on a plurality of hooks attached to the front enclosure means.

20. The enclosure system of claim 14 wherein the front enclosure means and rear enclosure means are releasably secured by a latch mechanism.

* * * * *